Figure 1:
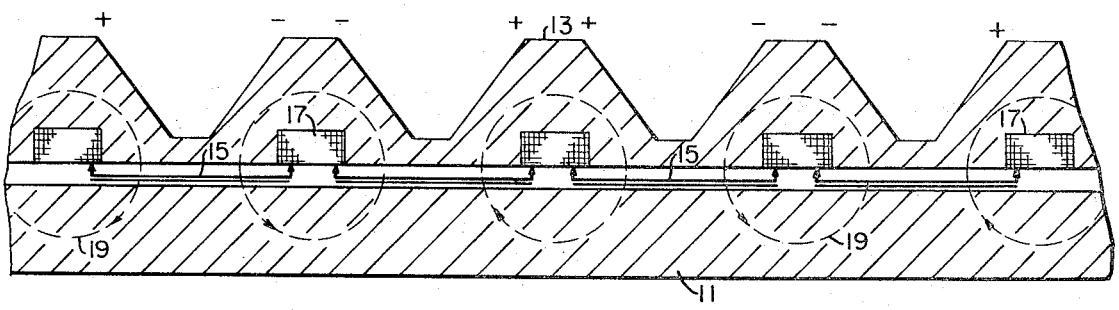
Figure 2:
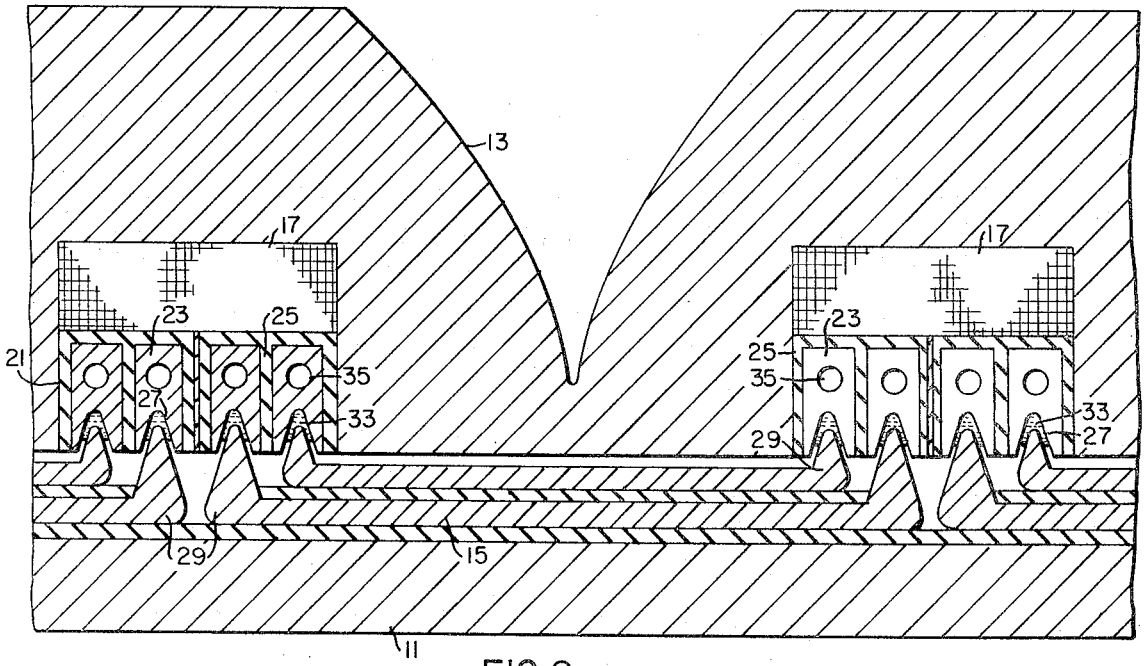
Figure 3:
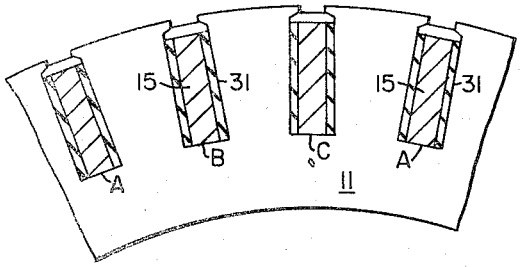
Figure 5:
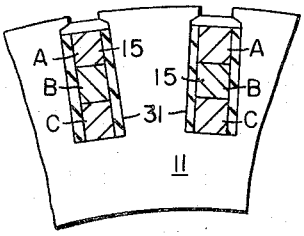
Figure 4:
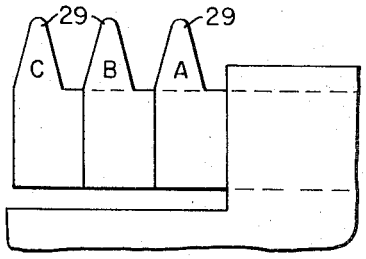
Figure 6:
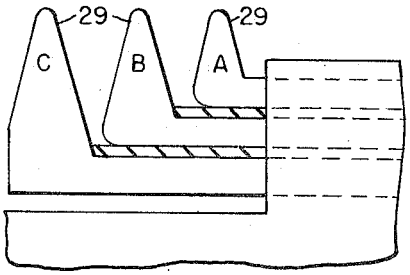
Figure 7:
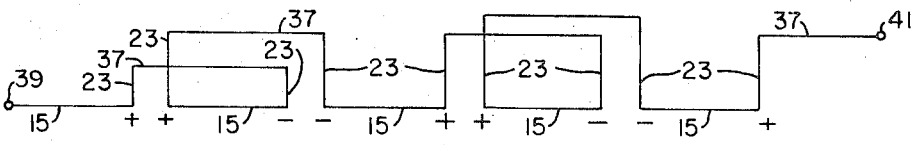
Figure 8:
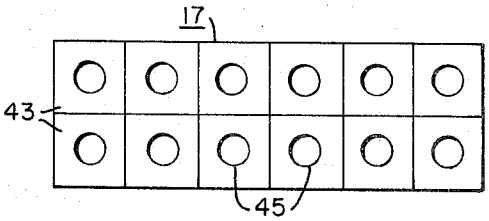
Figure 9:
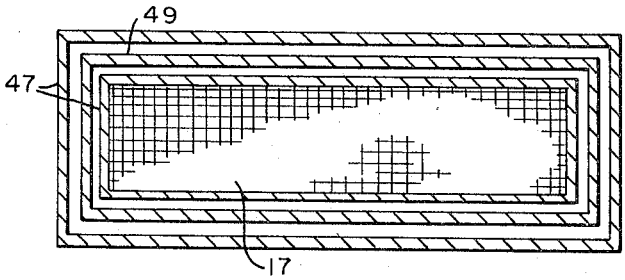
Figure 10:
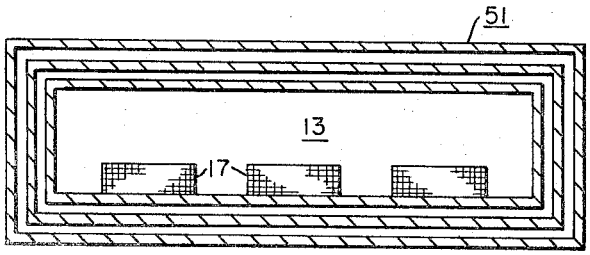

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 7

T920,005

SEGMENTED MAGNET HOMOPOLAR DYNAMO-ELECTRIC MACHINES HAVING FLUID COOLED LIQUID METAL CURRENT COLLECTING ZONES

Cecil J. Mole, Monroeville, Pa., assignor to Westinghouse Electric Corporation, Pittsburgh, Pa.

Filed Mar. 6, 1973, Ser. No. 338,489
**Int. Cl. H02k *31/00***
U.S. Cl. 310—178
2 Sheets Drawing. 15 Pages Specification

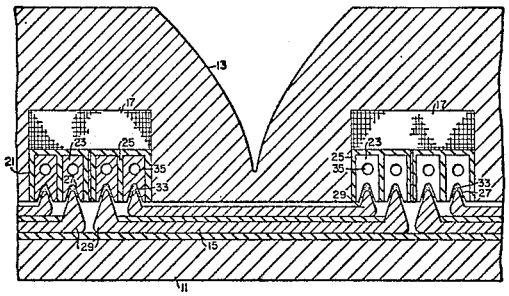

A homopolar dynamoelectric machine is constructed with a magnetic field that is broken into segments along the axis of the machine. Liquid metal contacts are utilized to transmit electrical energy between the armature and current collecting members which have ducts for the transmission of cooling fluid located therein. Grouping armature conductors, and appropriately interconnecting the current collecting members to serially relate the voltages induced in the armature conductors in order to increase the magnitude of the output voltage, permits achievement of the desired output characteristics.

SEGMENTED MAGNET HOMOPOLAR DYNAMOELECTRIC MACHINES HAVING FLUID COOLED LIQUID METAL CURRENT COLLECTING ZONES

Filed March 6, 1973 2 Sheets-Sheet 1